United States Patent [19]

Eguchi

[11] Patent Number: 5,402,282
[45] Date of Patent: Mar. 28, 1995

[54] DEVICE FOR SETTING ONE CASSETTE TAPE OF A SERIES OF CASSETTE TAPES INTO A TAPE DRIVE SECTION

[75] Inventor: Naoki Eguchi, Ageo, Japan

[73] Assignee: Kabushiki Kaisha Toshiba, Kawasaki, Japan

[21] Appl. No.: 971,597

[22] Filed: Nov. 5, 1992

[30] Foreign Application Priority Data

Nov. 7, 1991 [JP] Japan .................. 3-291286

[51] Int. Cl.6 .................. G11B 15/68
[52] U.S. Cl. .................. 360/92
[58] Field of Search .................. 360/92, 94; 369/36, 369/178, 191, 37

[56] References Cited

U.S. PATENT DOCUMENTS

| 5,025,331 | 6/1991 | Hirayama et al. | 360/94 |
| 5,031,057 | 7/1991 | Kikuchi et al. | 360/92 |
| 5,089,920 | 2/1992 | Bryer et al. | 360/92 |
| 5,115,362 | 5/1992 | Harada et al. | 360/92 |
| 5,115,419 | 5/1992 | Akiyama et al. | 369/37 |
| 5,148,332 | 9/1992 | Tomita et al. | 360/92 |

FOREIGN PATENT DOCUMENTS

| 389199 | 9/1990 | European Pat. Off. . |
| 406950 | 1/1991 | European Pat. Off. . |
| 060396 | 9/1992 | European Pat. Off. . |
| 2562305 | 10/1985 | France . |
| 216658 | 8/1990 | Japan | 360/92 |
| 498304 | 8/1992 | Japan . |
| 202986 | 10/1988 | United Kingdom . |

OTHER PUBLICATIONS

Patent Abstract from Japan, Publication Number JP2031364, dated Jan. 2, 1990, vol. 014185, dated Apr. 13, 1990, Titled "Magnetic Recording and Reproducing Device".

Primary Examiner—A. J. Heinz
Assistant Examiner—George J. Letscher
Attorney, Agent, or Firm—Cushman, Darby & Cushman

[57] ABSTRACT

A cassette setting device wherein first and second cassette housing sections in which tape cassettes are housed flat are arranged in a tray, which is carried to a position to enable the tape cassette in one of the first and second cassette housing sections to be set at a tape drive section and which is then reversely carried to another position, while keeping the tape cassette in the one cassette housing section set at the tape drive section, to enable the tape cassette in the other to be picked up and exchanged with a new one.

6 Claims, 7 Drawing Sheets

DEVICE FOR SETTING ONE CASSETTE TAPE OF A SERIES OF CASSETTE TAPES INTO A TAPE DRIVE SECTION

BACKGROUND OF THE INVENTION

1. Field of the Invention

The present invention relates to a magnetic recording and reproducing apparatus such as the video tape recorder (which will be hereinafter referred to as VTR) and, more particularly, a device used to set a tape cassette at the tape drive section in the apparatus.

2. Description of the Related Art

Most of the programs have been television-broadcast for a long time these days and the number of these programs broadcast past midnight has increased particularly since the start of setellite broadcasting. This requires a VTR to be capable of recording these programs for a long time with reliability even when the user is out of his home.

In the case of the conventional VTRs, however, the time length during which the programs can be recorded has a limit because the length of the magnetic tape wound round a tape cassette is limited. When long television-broadcast programs are to be recorded from their start to end, the tape cassette must be sometimes exchanged with new ones, thereby causing some of the programs recorded on their corresponding tapes to be incomplete.

SUMMARY OF THE INVENTION

The object of the present invention is therefore to provide a cassette setting device, simpler in structure and easier to be used for recording and reproducing the programs, but capable of exchanging the tape cassettes in the device with new ones without missing the end of the programs.

This object of the present invention can be achieved by cassette setting device comprising cassette housing means having plural housing sections in which tape cassettes are housed flat, and freely movable between a first position where the tape cassettes can be housed in and picked up from the housing sections and a second position where the tape cassettes in the housing sections can be set at and released from a tape drive; section; a cassette setting mechanism for setting and releasing one of the tape cassettes in the plural housing sections at and from the tape drive section when the cassette housing means is at the second position; and a mechanism for carrying the cassette housing means between the first and the second position wherein when one of the tape cassettes in the plural housing sections is set at the tape drive section at the second position, the cassette housing means is carried to the first position, while keeping the tape cassette set at the tape drive section, to enable the other of them to be housed in and picked up from the housing section.

DETAILED DESCRIPTION OF THE PREFERRED EMBODIMENT

An embodiment of the present invention will be described in detail with reference to the accompanying drawings.

Figure 1:
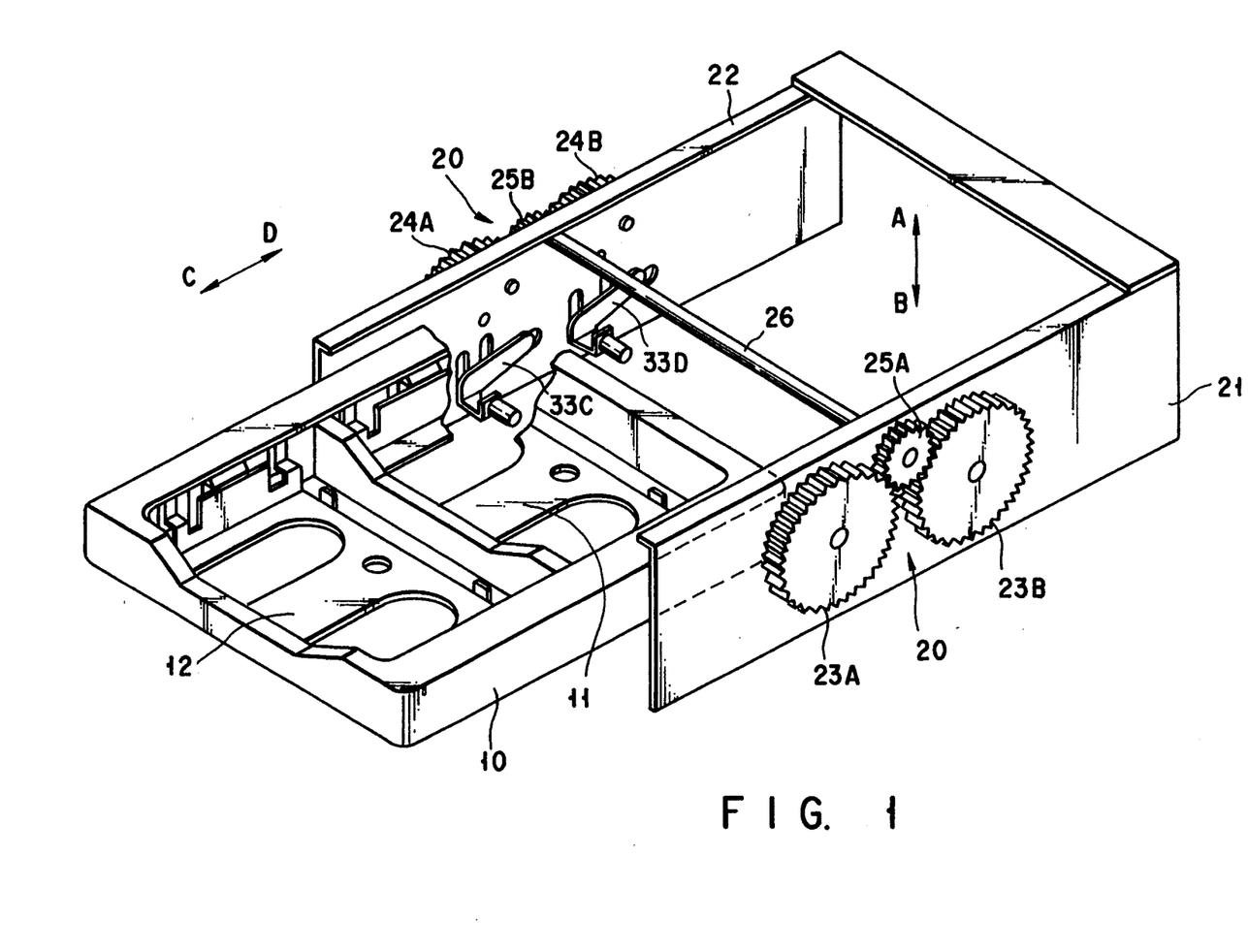
FIG. 1 is a perspective view showing a main portion of the cassette setting device according to an embodiment of the present invention.

FIG. 1 shows main portion of the cassette setting device according to an embodiment of the present invention. First and second cassette housing sections 11 and 12 are arranged side by side in cassette carrying directions in tray 10 which forms a cassettes housing means. Tape cassettes 9 (see FIGS. 2, 3A and 3B) are housed substantially flat in these cassette housing sections 11 and 12, respectively. The first and second cassette housing sections 11 and 12 can be lifted, independent of the other, from the tray 10 in directions A and B by a cassette lifter mechanism 20 which will be described later.

Figure 2:
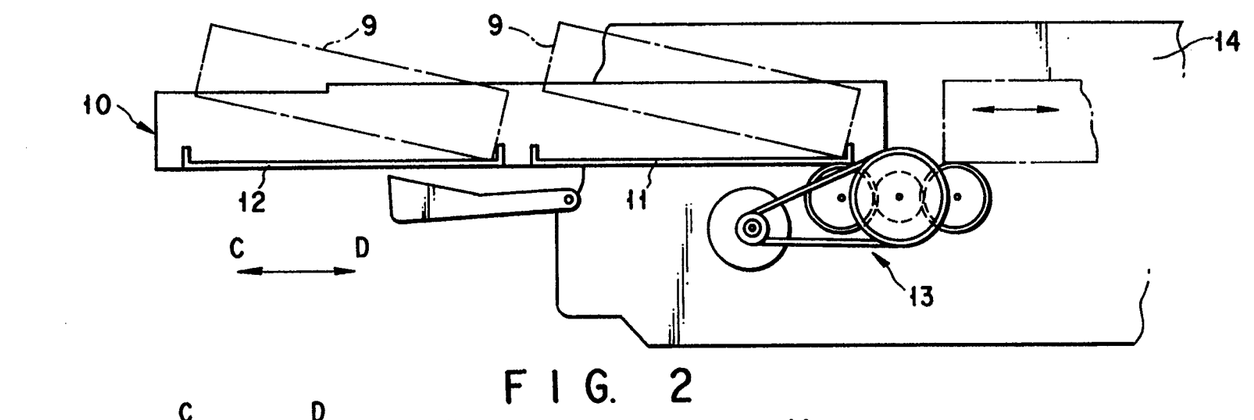
FIGS. 2, 3A and 3B are plans showing a tray carrier mechanism in FIG. 1.
Figure 3A:
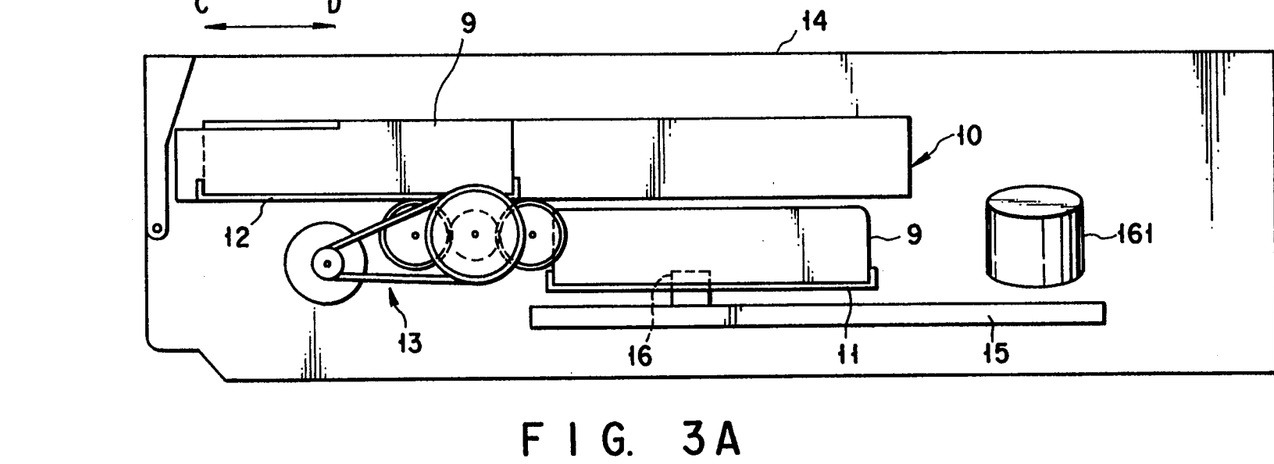
Figure 3B:
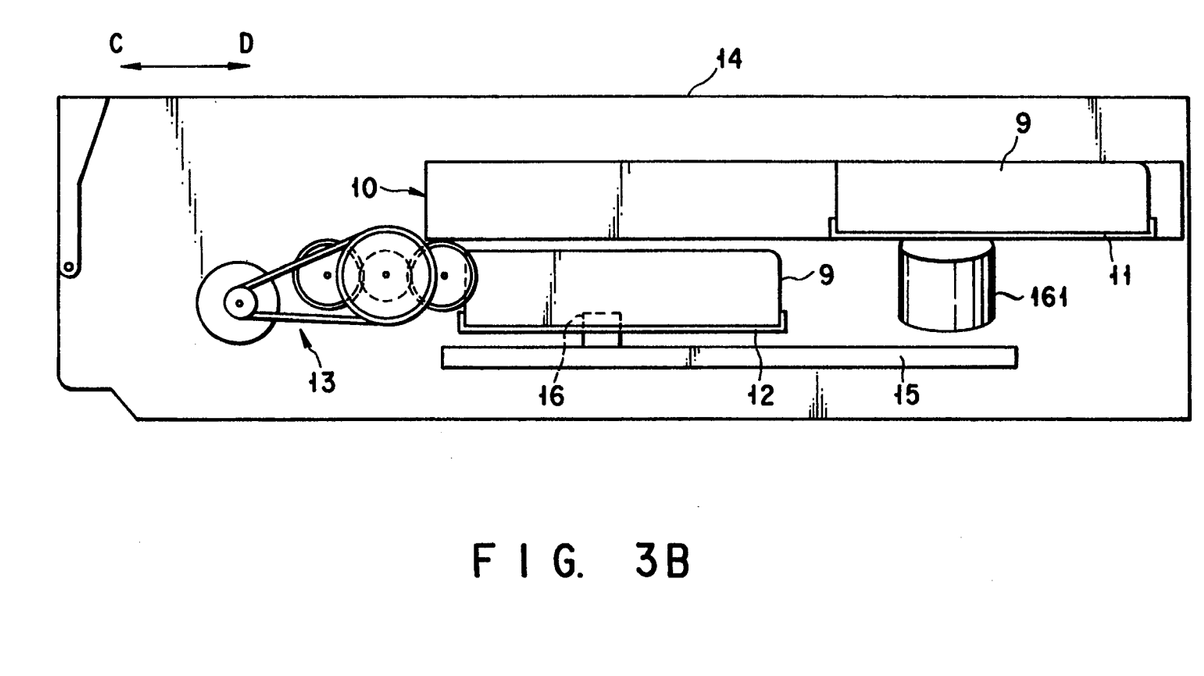

As shown in FIGS. 2, 3A and 3B, the tray 10 is carried in directions C and D by a tray carrier mechanism 13, to a first position where it is projected from the front side of cabinet 14 so as to enable the tape cassettes 9 to be set in and supported thereon (see FIG. 2) and to a second position within the cabinet 14 so as to enable one of the tape cassettes 9 housed in the first and second cassette housing sections 11 and 12 to be set at a tape drive section 16 (see FIGS. 3A and 3B). The tape drive section 16 comprises well-known reel means, capstans and pinch rollers and serves to drive the tape in the tape cassette.

When the tray 10 has been carried to the second position, either of the first and second cassette housing sections 11 and 12 is lowered by the cassette lifter mechanism 20 to set its tape cassette 9 at the tape drive section 16. The tape in the tape cassette 9 is then drawn and set round a round drum 161 by a tape loading mechanism (not shown), thereby becoming ready for recording reproducing.

There will be described the cassette lifter mechanism 20 by which either of the first and second cassette housing sections 11 and 12 in the tray 10 is selectively lifted and lowered to set its tape cassette 9 in and out of the tape drive section 16.

The tray 10 is supported between and by two side chassis 21 and 22, freely movable in the directions C and D, and pair of cam gears 23A, 23B and another pair of cam gears 24A, 24B are also freely rotatably supported by these side chassis 21 and 22, respectively, to drive either of the cassette housing sections 11 and 12 up and down. The cam gears 23A and 23B are connected to each other via a connector gear 25A while the cam gears 24A and 24B are connected to each other via a connector gear 25B. The connector gears 25A and 25B are connected to each other by a connector rod 26. The cam gears 23A, 23B and 24A, 24B can be thus rotated, associating with a drive motor (not shown).

One pair of these cam gears 23A, 23B and 24A, 24B which form the cassette lifter mechanism 20 is arranged on one side chassis 21 while the other on the other side chassis 22. For the sake of making the description simpler, however, only the cam gears 23A and 23B on the side chassis 21 will be described.

Figure 4:
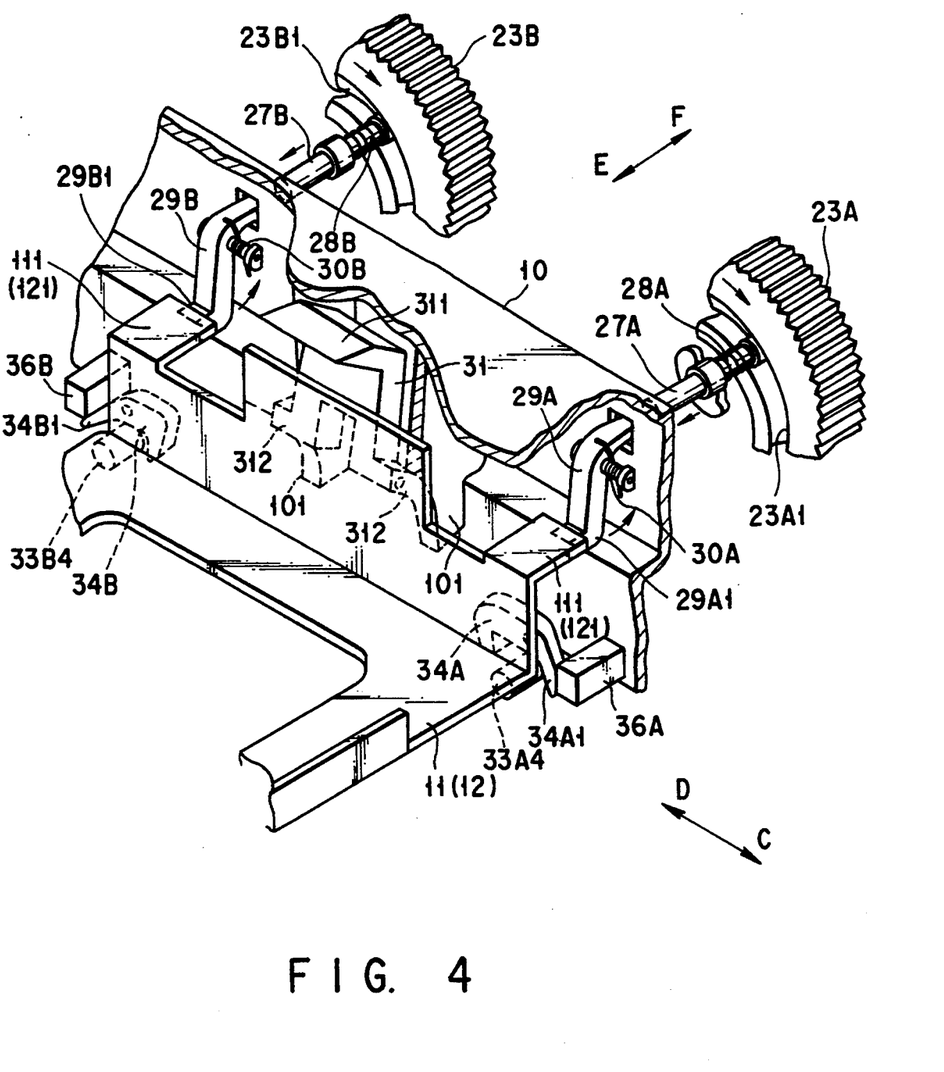
FIG. 4 is a perspective view showing in detail a portion of a cassette lifter mechanism in FIG. 1.
Figure 6:
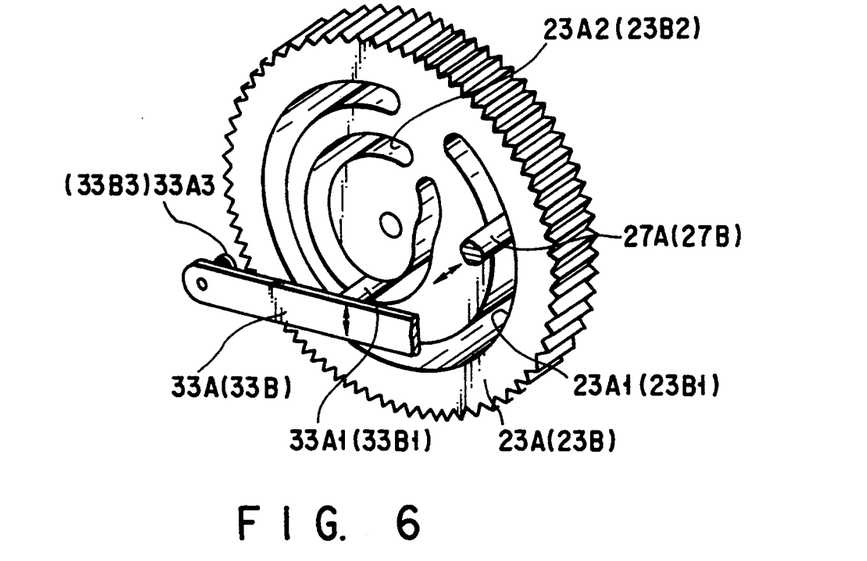
FIG. 6 is a perspective view showing in detail another part of that portion of the cassette lifter mechanism which is shown in FIGS. 4 and 5.

As shown in FIG. 6, each of the cam gears 23A and 23B is provided with a first thrust drive cam section 23A1 (or 23B1) and a second radial drive cam section 23A2 (or 23B2). One end of a releasing rod 27A (or 27B) is fitted into the first cam section 23A1 (or 23B1). As shown in FIG. 4, the releasing rod 27A (or 27B) is supported by the side chassis 21, freely movable in directions E and F, and usually urged in the direction E by a spring member 28A (or 28B).

One end of a holder lever 29A (or 29B) for the cassette housing section in the tray 10 is engaged with the other end of the releasing rod 27A (or 27B). The holder lever 29A (or 29B) is urged clockwise in FIG. 4 by a spring member 30A (or 30B) and provided with a holder 29A1 (or 29B1) at the other end thereof. This holder 29A1 (or 29B1) of the holder lever 29A (or 29B) is in opposite to its corresponding engaged part 111 (or 121), each of the first and second cassette housing sections 11 and 12 having the engaged parts 111 (or 121) at its four corners.

When the releasing rods 27A and 27B are forced against the spring members 28A and 28B in the direction E by the first cam sections 23A1 and 23B1 of the cam gears 23A and 23B, the holder levers 29A and 29B are rotated counter-clockwise in FIG. 4 against the spring members 30A and 30B. The holders 29A1 and 29B1 of the holder levers 29A and 29B are thus released from the engaged parts 111 of the first cassette housing section 11 (or those 121 of the second cassette housing section 12), leaving the first cassette housing section 11 (or second one 12) releasable from the tray 10.

When the releasing rods 27A and 27B are forced against the spring members 28A and 28B in the direction F by the first cam sections 23A1 and 23B1 of the cam gears 23A and 23B, the holder levers 29A and 29B are rotated clockwise in FIG. 4 by the spring members 30A and 30B. The holders 29A1 and 29B1 of the holder levers 29A and 29B are thus engaged with the engaged parts 111 of the first cassette housing section 11 (or those 121 of the second cassette housing section 12), thereby making the first cassette housing section 11 (or second one 12) seated integral in the tray 10.

Figure 5:
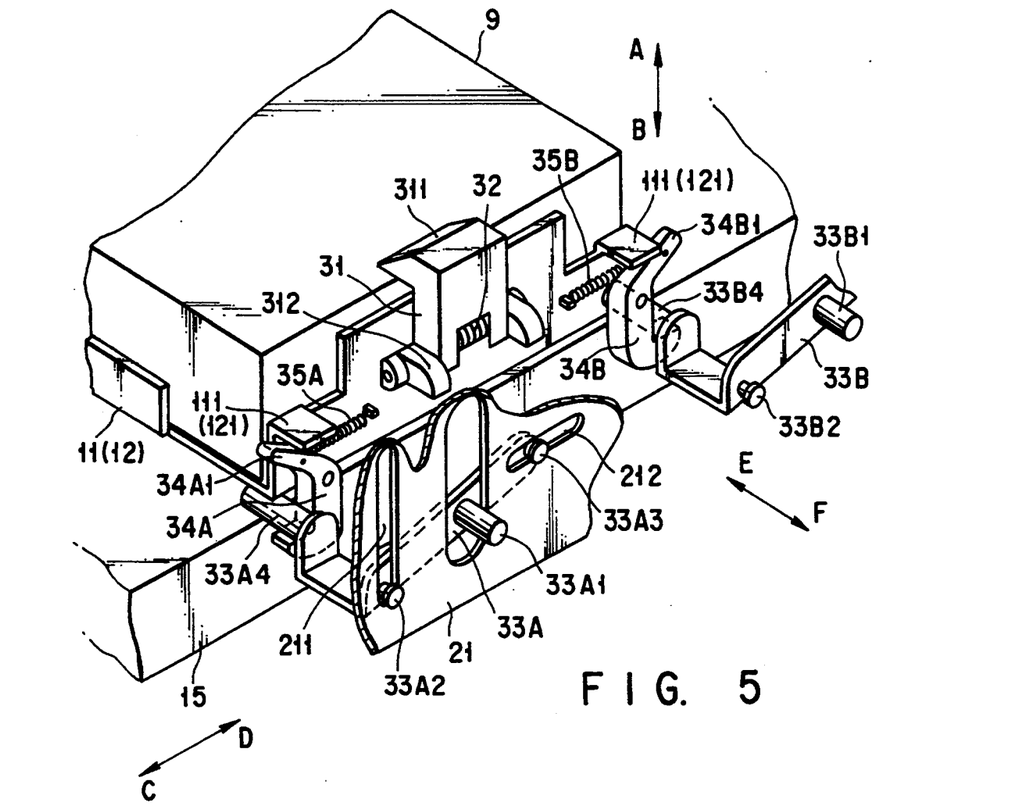
FIG. 5 is a perspective view showing in detail a part of that portion of the cassette lifter mechanism which is shown in FIG. 4.

As shown in FIG. 5, a cassette pressing lever 31 is freely swingably arranged on each of both sides of the first and second cassette housing sections 11 and 12 in the tray 10, while being urged clockwise in FIG. 5 by a spring member 32. An engaging part 311 is formed at the front end of the cassette pressing lever 31, facing the tape cassette 9, and engaged parts 312 are formed at the base thereof. Drive cam sections 101 of the tray 10 are engaged with the engaged parts 321 of the cassette pressing lever 31.

When the first cassette housing section 11 (or second one 12) is lowered as will be described later, the engaged parts 312 of the cassette pressing lever 31 are forced by the spring member 32 and the cam sections 101 to swing the cassette pressing lever 31 counter-clockwise in FIG. 4, thereby causing the engaging part 311 to hold the tape cassette 9 in the first cassette housing section 11 (or second one 12). When the first or second cassette housing section 11 or 12 is lifted, the engaged parts 312 of the cassette pressing lever 31 are forced against the spring member 32 by the cam sections 101 to swing the cassette pressing lever 31 clockwise in FIG. 4, thereby causing the tape cassette 9 to be released from the engaging part 311 of the cassette pressing lever 31, that is, from the first or second cassette housing section 11 or 12.

Drive rods 33A1 and 33B1 of drive levers 33A and 33B are fitted into second cam sections 23A2 and 23B2 in the paired cam gears 23A and 23B, as shown in FIG. 6. The drive rods 33A1 and 33B1 of the drive levers 33A and 33B are loosely passed through the side chassis 21, by which their movement in the directions C and D is limited.

Figure 7:
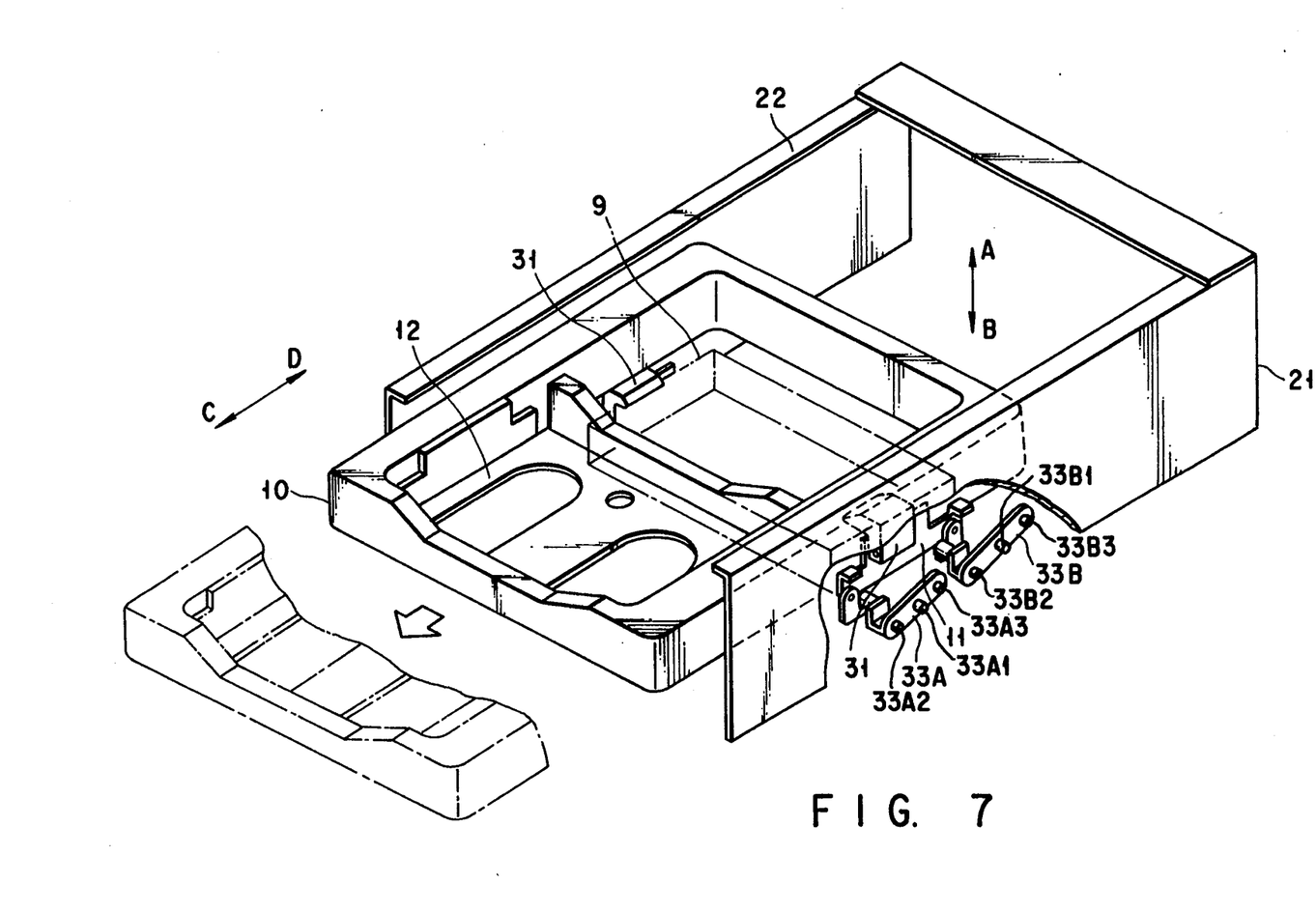
FIG. 7 is a perspective view showing how the cassette setting device in FIG. 1 is operated.
Figure 8:
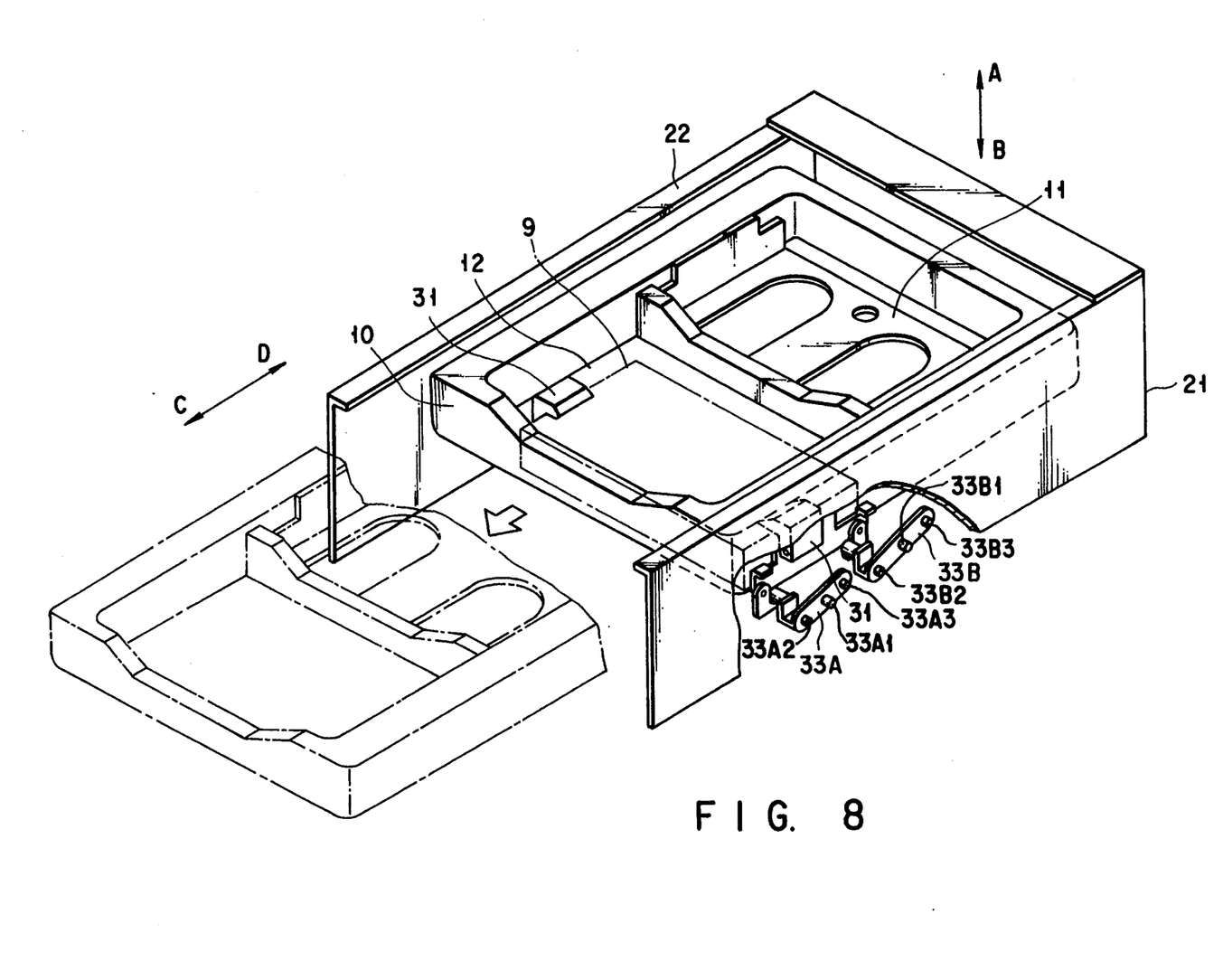
FIG. 8 is a perspective view showing how the cassette setting device in FIG. 1 is operated.

The drive lever 33A has guides 33A2 and 33A3 between which the drive rod 33A1 is arranged (see FIGS. 7 and 8). The drive lever 33B has guides 33B2 and 33B3 with the drive rod 33B1 interposed between them (see FIGS. 7 and 8). The guides 33A2 and 33A3 are passed through guide slits 211 and 212 of the side chassis 21 and guided therealong (guide slits for the guides 33B2 and 33B3 are not shown, for the sake of simplicity, in FIG. 5). When their drive rods 33A1 and 33B1 are driven by the second cam sections 23A2 and 23B2 of the cam gears 23A and 23B, the drive levers 33A and 33B are moved in the directions A and B with their guides 33A2, 33A3 and 33B2, 33B3 being guided along the guide slits 211 and 212 of the side chassis synchronizing with the movement of their drive rods 33A1 and 33B1.

The drive levers 33A and 33B have engaging pins 33A4 and 33B4, which are arranged opposite to lock members 34A and 34B freely swingably attacked to the first or second cassette housing section 11 or 12. The lock member 34A is urged clockwise by a spring member 35A and the lock member 34B counter-clockwise by a spring member 35B. One ends of the lock members 34A and 34B are formed as lock releasing parts 34A1 and 34B1 which are opposed to lock releasing members 36A and 36B (see FIG. 4).

The lock releasing members 36A and 36B are arranged on each of both sides of the tray 10 and they are release from the lock members 34A and 34B when the drive levers 33A and 33B are moved in the direction B and the first or second cassette housing section 11 or 12 is thus lowered as described above. Therefore, the lock releasing parts 34A1 and 34B1 of the lock members 34A and 34B are swung, as shown in FIG. 5, by the spring members 35A and 35B and engaged with the pins 33A4 and 33B4 of the drive levers 33A and 33B. The first or second cassette housing section 11 or 12 is thus released from the tray 10 and carried together with the drive lever 33A and 33B to the tape drive section 16.

When the drive levers 33A and 33B are moved in the direction A and the first or second cassette housing sections 11 or 12 is thus raised, the lock releasing members 36A and 36B force the lock releasing parts 34A1 and 34B1 of the lock members 34A and 34B to swing against the spring members 35A and 35B, as shown in FIG. 4. The lock releasing parts 34A1 and 34B1 of the lock members 34A and 34B are thus released from the pins 33A4 and 33B4 of the drive levers 33A and 33B. The first or second cassette housing section 11 or 12 is released this time from the drive levers 33A and 33B. At the same time, it is seated in the tray 10 with its engaged parts 111 or 121 held by the holders 29A1 and 29B1 of the holder levers 29A and 29B.

The drive levers 33C and 33D are arranged to the side chassis 22 in the same manner as in the case of the drive levers 33A and 33B. They are moved by the cam gears 24A and 24B, synchronizing with the drive levers 33A and 33B.

The tray 10 is carried in the direction C by the tray carrier mechanism 13 and when it is projected from the front side of the cabinet 14 at the first position, the tape cassettes 9 are set into and picked up from the first and second cassette housing sections 11 and 12. It is also carried in the direction D by the tray carrier mechanism 13 and when it is at the second position, either of the first and second cassette housing sections 11 and 12 is opposed to the tape drive section 16. When it is at the second position, the tape cassette 9 in the first or second cassette housing section 11 or 12 can be opposed to the tape drive section 16 as shown in FIGS. 3A and 3B. Using drive means of the tray carrier mechanism which includes a member for detecting the position of the tray 10, it can be selected by the user which of the tape cassettes 9 in the first and second cassette housing sections 11 and 12 is opposed to the tape drive section 16. This may be automatically achieved.

When the drive motor (not shown) is driven and the cam gears 23A, 23B (and 24A, 24B) are rotated, the releasing rods 27A and 27B are forced against the spring members 28A and 28B in the direction F by their first cam sections 23A1 and 23B1 and the holder levers 29A and 29B are thus swung against the spring members 30A and 30B to release their holders 29A1 and 29B1 from the engaged parts 111 or 121 of the first or second cassette housing section 11 or 12.

The cam gears 23A, 23B and 24A, 24B urge the drive rods 33A1 and 33B1 of the drive levers 33A and 33B by their second cam sections 23A2 and 23B2 to carry the drive levers 33A and 33B in the direction B. The lock members 36A and 36B of the first cassette housing section 11 (or those of the second cassette housing section 12 are engaged this time with the pins 33A4 and 33B4 of the drive levers 33A and 33B. The first or second cassette housing section 11 or 12 is therefore released from the tray 10 and lowered, synchronizing with the movement of the drive levers 33A and 33B in the direction B. At the same time, the engaging part 311 of the cassette pressing lever 31 is guided by the drive cams 101 of the tray 10 and swung against the spring member 32 to hold the tape cassette 9 in the first or second cassette housing section 11 or 12 and set it at the tape drive section 16.

When the tape cassette is thus set at the tape drive section 16, a new tape cassette 9 can be set into the first or second cassette housing section 11 or 12 in the tray 10.

When the new tape cassette 9 is to be set, the tray carrier mechanism 13 is reversely driven to move the tray 10 to the first position where the tray 10 is projected from the front side of the cabinet 14, as shown in FIGS. 7 and 8. The tape cassette 9 in the first or second cassette housing section 11 or 12 in the tray 10 is then exchanged with the new one and the tray carrier mechanism 13 is again driven to carry the tray 10 to the second position in the cabinet 14.

When the tape cassette 9 which has been set at the tape drive section 16 is to be exchanged with the new one, that one of the first and second cassette housing sections 11 and 12 which has been set together with the tape cassette 9 at the tape drive section 16 is lifted and combined with the tray 10. The tray 10 is then carried by the tray carrier mechanism 13 so that the other one of them in which the new tape cassette 9 has been housed is opposed to the tape drive section 16. This cassette housing section is then released from the tray 10 and lowered by the cassette lifter mechanism 20 to set the new tape cassette 9 at the tape drive section 16.

The tray enables new plural type cassettes to be successively set at the tape drive section 16 in this manner so that recording and reproducing can be continuously made for a longer time.

When the tape cassette 9 which has been set at the tape drive section 16 is to be picked up from the tray 10, the drive motor (not shown) is reversely driven to rotate the cam gears 23A, 23B (and 24A, 24B) in the reverse direction, while keeping the tray 10 at the second position in the cabinet 14. The drive rods 33A1 and 33B1 of the drive levers 33A and 33B are thus raised in the direction A by the second cam sections 23A2 and 23B2 of the cam gears 23A and 23B and the first or second cassette housing section 11 or 12 is moved in the same direction by the pins 33A4 and 33B4 of the drive levers 33A and 33B.

When the first or second cassette housing section 11 or 12 is raised, the engaging parts 34A1 and 34B1 of the lock members 34A and 34B are struck against the lock releasing members 36A and 36B so that the lock members 34A and 34B are swung against the spring members 35A and 35B to release from the pins 33A4 and 33B4 of the drive levers 33A and 33B. The engaged parts 312 of the cassette pressing lever 31 are guided by the drive cams 101 of the tray 10 so that the lever 31 is reversely swung against the spring member 32 to release its engaging part 311 from the tape cassette 9.

At the same time, the releasing rods 27A and 27H are released from their pressed state by the first cam sections 23A1 and 23B1 of the cam gears 23A and 23B and allowed to move in the direction F by a spring member 28A and 28B. As the result, the holder levers 29A and 29B are reversely swung to cause their holders 29A1 and 29B1 to be engaged with the engaged parts 111 or 121 of the first or second cassette housing section 11 or 12 so that the first or second cassette housing section 11 or 12 can be combined integral with the tray 10. The tray carrier mechanism 13 is then reversely driven to carry the tray 10 to the first position where the tray 10 is projected from the front side of the cabinet 14. This enables the tape cassettes 9 to be set into and picked up from the first and second cassette housing sections 11 and 12.

According to the above-described cassette setting device, the first and second cassette housing sections 11 and 12 in which the tape cassettes 9 have been housed flat are freely relesably arranged in the tray 10, which is carried to a position where the tape cassette 9 housed in one of the first and second cassette housing sections 11 and 12 can be set at the tape drive section 16. While keeping the tape cassette 9 set at the tape drive section 16, the tray 10 is reversely carried to another position where the tape cassette 9 remaining in the other of them can be picked up and exchanged with a new one. Therefore, two or more tape cassettes can be successively used to achieve a longer recording and reproducing work. In addition, the setting of the tape cassettes at the tape drive section can be made easier.

Although the first and second cassette housing sections 11 and 12 in the tray 10 have been arranged side by side in the tray-carrying direction in the above-described case, they may be arranged side by side in a direction perpendicular to the tray-carrying direction.

Although two cassette housing sections 11 and 12 have been provided in the tray 10 in the above-described case, three or more sections may be provided.

It should be therefore understood that the present invention is not limited to the above-described embodiment and that various modifications and changes can be made without departing from the spirit and scope of the present invention.

What is claimed is:

1. A device for setting tape cassettes comprising:
   a cabinet;
   cassette housing means having housing sections arranged side by side therein for simultaneously housing at least two tape cassettes, the cassette housing means being freely movable between a first position where the cassette housing means is projected from a front side of the cabinet to enable the tape cassettes to be inserted into or picked up from the housing sections and a second position where one of the tape cassettes in one of the housing sections can be set at and released from a tape drive section in the cabinet;
   a cassette setting mechanism for moving any one of the housing sections from the cassette housing means to the tape drive section, so that the tape cassette housed in one of the housing sections moved to the tape drive section may be engaged with a tape drive, and for moving said one housing section from the tape drive section to the cassette housing means; and
   a drive mechanism mounted in the cabinet constructed and arranged to move the cassette housing means from the first position to the second position, thereby enabling one of the housing sections to be disposed at the tape drive section via the cassette setting mechanism, and to move the cassette housing means from the second position to the first position, wherein when the tape cassette housed in said one housing section is maintained at the tape drive section, at least one of the other tape cassettes may be inserted into or picked up from one of the of the housing means.

2. The cassette setting device according to claim 1, wherein said cassette setting mechanism includes
   means for releasing one of the housing sections from the cassette housing means when the cassette housing means is carried to the second position, and
   means for lifting and lowering the housing section, which has been released from the cassette housing means by the releasing means, for setting and releasing a tape cassette at and from the tape drive section.

3. The cassette setting device according to claim 1, wherein said cassette setting mechanism includes
   means for releasing one of the housing sections from the cassette housing means when the cassette housing means is carried to the second position,
   means for lifting and lowering the housing section for setting and releasing a tape cassette at and from the tape drive section,
   means for combining the released housing section with the lifter means, and
   means for driving the releasing, combining and lifter means in time sequence.

4. The cassette setting device according to claim 1, wherein said cassette setting mechanism includes
   means for detachably supporting the housing sections in the cassette housing means,
   means for lifting and lowering the housing section to set and release a tape cassette at and from the tape drive section,
   means for combining the housing section with the lifter means, and
   means including rotary cams to drive the supporting, holding, lifter and combining means when the cassette housing means is moved to the second position,
   said drive means causing the housing section to be released from the cassette housing means, a tape cassette to be held in the housing section, the housing section to be combined with the lifter means and the tape cassette to be set at the tape drive section when the rotary cams are rotated in one direction, and said drive means also causing the tape cassette to be released from the tape drive section, the housing section to be released from the combining means, the tape cassette to be released from the housing section and the housing section to be supported in the cassette housing means when the rotary cams are rotated in a direction opposite, said one direction.

5. The cassette setting device according to claim 3, wherein said drive means includes a rotary cam system driven by a single drive source.

6. The cassette setting device according to claim 1, wherein said housing sections are arranged side by side in the direction in which the cassette housing means is carried.

* * * * *